3,010,834
IMPRESSION COMPOUND
Walter S. Crowell, Melrose Park, Pa., assignor to The S. S. White Dental Manufacturing Co., Philadelphia, Pa., a corporation of Pennsylvania
No Drawing. Filed Jan. 5, 1960, Ser. No. 499
13 Claims. (Cl. 106—38.4)

This invention relates to compounds which are employable in a fluid form in contact with a body to be reproduced, and which then set to elastic gels which may be removed and employed as matrices in preparing replicas of such body. Such compounds are employed by dentists in preparing impressions of the mouth and teeth, whereby socalled restorations may be made up in the absence of the patient.

In the Wilding U.S. Patent 2,249,694, such a compound is prepared from an alginate, with addition of calcium sulfate as a setting agent, and a pyrophosphate as a retarding agent to prevent an excessively rapid setting. Such impression compounds have been in use: but it has been found that a later interaction of the stiff gel of the matrix with a dental stone or alpha gypsum composition, such as the low consistency plaster sold under the trade name Hydrocal, placed thereagainst to form the replica, may lead to a rough or soft surface on the replica whereby it does not accurately reproduce the original. It has been proposed to offset this difficulty by employing fluorides in the impression compound, or by employing after-treatment of the impression to prevent it.

It has now been found that the difficulty can be avoided by employing zinc salts of bibasic organic acids having a solubility in water of about 0.05 to 1.0 percent at 25 degrees C.

Illustratively, the following formulation may be prepared as a dry mixture of powders:

| | Parts by weight |
|---|---|
| Water-soluble alginate | 10–15 |
| Primary setting agent | 6–15 |
| Zinc salt | 0.5–10.0 |
| Retarder | 0.5–2.0 |
| Filler, color and flavor to make 100 parts by weight. | |

Present preferences are calcium sulfate dihydrate as primary setting agent and sodium pyrophosphate as retarder, but other known coactive setting agents and retarders can be used. A preferred filler is infusorial earth; but other inert powders may be employed: in the above formulation, the amount of filler is 83 to 58 percent of the total weight. The color and flavor components are not required, but are preferably added as with prior impression compounds for the sake of appearance and to avoid the objections of some patients to the taste of the mixture in the mouth during setting.

The zinc salt may be selected from the zinc salts of succinic, glutaric and phthalic acids. The phthalic acid may be ortho-phthalic, isophthalic or terephthalic acid. Succinic and glutaric acids are aliphatically saturated dicarboxylic acids. Mixtures of such salts may be used. Such salts should be essentially neutral when in solution; that is, a slight excess of zinc oxide may be present above stoichiometric equivalency.

A specific example, in parts by weight, for one commercial lot of potassium alginate is:

| | Parts |
|---|---|
| Water-soluble alginate | 15.0 |
| Calcium sulfate dihydrate | 12.5 |
| Zinc succinate | 2.5 |
| Sodium pyrophosphate | 1.0 |
| Infusorial earth, flavor and color, to make 100 parts. | |

The quantity of the zinc salt employed depends upon the molecular weights of the alginate components employed, such alginates being commercially available as water soluble sodium and potassium salts, which are useful for this composition. When 0.5 percent by weight is present, the smoothness and hardness of the dental stone or alpha gypsum casting made as a replica is significantly improved, with a maximum effect usually observable at 2 to 3 percent. Above 4 percent, the wetted composition may be lumpy, and difficulty then encountered in preparing and using the hydrated composition in taking the impression.

The quantity of zinc salt is thus between 0.5 and 10 percent of the composition. In practice, the quantity of calcium sulfate dihydrate is preferably greater than that stoichiometrically necessary to combine with the alignate to form a gel and to satisfy the retarding agent: thus the amount by weight is greater than the sum of 30 percent by weight of the alginate plus 1¼ times the weight of the pyrophosphate. The zinc salt additive can be expressed as between 5 and 100 percent by weight of the weight of the soluble alginate, preferably around 20 to 30 percent.

In action, when water has been added, the primary setting agent dissolves, being at first largely sequestrated by the retarding agent. The zinc salt likewise dissolves, and in part is also sequestrated. These dissolutions are relatively slow. Therewith, some of the setting agent and some zinc salt may react with the water-soluble algin as this also dissolves, but effect insignificant precipitation of insoluble alginate gel until the retarder is exhausted. After the retarding agent has become largely satisfied, the gel formation continues by the residual calcium sulfate and the zinc salt. It is believed that the action of the zinc salt includes the production, from the most water-soluble fractions of the alginate, of an insoluble gel which does not react by softening or scurfing when in contact with the casting plaster or stone and likewise does not adversely affect the ability of the casting plaster or stone to form a hard-surfaced and accurate replica. The quantities of calcium sulfate and zinc salt must be at least sufficient to effect the gel-formation by the alginate components, and to offset the initial effect of the retarding agent; an excess is not harmful.

Characteristics of the useful zinc salts are that they are crystalline in nature and of low solubility in water so that they do not act adversely in producing a rapid setting.

In operation, the composition may be made, shipped and stored as a dry mixture of the powders; noting that the specific gravities are closely similar so that dehomogenization does not occur when shaken during shipment. The composition can be measured from the shipping container into a mixing bowl, and a quantity of water added sufficient to wet the composition and produce a stiffly fluid creamy mass: this mass can then be employed in the usual impression tray, and applied for example to a group of teeth. The interaction of the alginate with the setting agent causes the creamy mass to stiffen into an elastic, form-restoring solid, in a time controlled by the amount of retarder and setting agent present. The elastic gel then can be pulled from the teeth, with the parts which have been shaped at undercuts spreading by the elasticity of the mass so that unity is preserved, with the stretched portions then returning to the shape as set. A dental stone mixture, e.g., made with refined alpha gypsum, such as Hydrocal, and water, is prepared and poured into the matrix, with the usual care to avoid bubbles. Upon setting, the matrix can again be stripped elastically, leaving the cast as a true replica which has hard and smooth surfaces accurately reproducing the original.

It is obvious that the invention is not restricted to the illustrative practices, but can be employed in many ways within the scope of the appended claims.

What is claimed is:

1. A composition for impression molding consisting for active components of a water-soluble alginate, a neutral zinc salt of an acid selected from the group consisting of succinic, glutaric and phthalic acids, said zinc salt having a solubility in water of about 0.05 to 1.0 percent at 25 degrees C., said zinc salt being present as 5 to 100 percent by weight of the alginate, and a primary setting agent for the alginate effective in the presence of the zinc salt, the total of primary setting agent and zinc salt being in excess of that required to form an insoluble alginate gel.

2. The composition as in claim 1, in which the zinc salt includes zinc succinate.

3. The composition as in claim 1, in which the zinc salt includes zinc glutarate.

4. The composition as in claim 1, in which the zinc salt includes a zinc phthalate.

5. A composition for impression molding consisting by weight of 10 to 15 parts of water-soluble alginate, 6 to 15 parts of calcium sulfate dihydrate, 0.5 to 10 parts of a zinc salt of dicarboxylic acid selected from the group consisting of succinic, glutaric and phthalic acids, 0.5 to 2 parts of sodium pyrophosphate, with an inert filler powder to make 100 parts.

6. A composition as in claim 10, and including an alkali metal phosphate in amount by weight of about 8 percent of the said combined weight.

7. A composition for impression molding consisting by weight of 10 to 15 parts of an alkali alginate, 6 to 15 parts of calcium sulfate dihydrate, 0.5 to 2 parts of sodium pyrophosphate, a neutral zinc salt of an aliphatically saturated dicarboxylic acid selected from the group consisting of succinic, glutaric and phthalic acids, said zinc salt having a solubility in water of about 0.05 to 1.0 percent at 25 degrees C., and being present in the proportion of 20 to 30 percent of the weight of the alignate, and an inert powdery filler to make 100 parts.

8. A composition as in claim 7, in which the zinc salt is zinc succinate.

9. A composition for impression molding consisting for active components of a water-soluble alginate, a neutral zinc salt of an acid selected from the group consisting of succinic, glutaric and phthalic acids, said zinc salt having a solubility in water of about 0.05 to 1.0 percent at 25 degrees C., said zinc salt being present as 5 to 100 percent by weight of the alginate, a primary setting agent for the alginate effective in the presence of the zinc salt, the total of primary setting agent and zinc salt being in excess of that required to form an insoluble alginate gel, an inert filler powder, and a set-retarding agent effective upon the primary setting agent and zinc salt to control the rate of gel formation and present in amount of 0.5 to 2 percent by weight of the total composition, the inert filler being 58 to 83 percent by weight of the total composition.

10. A composition for impression molding consisting by weight of 10 to 15 parts of a water-soluble alginate, 6 to 15 parts of calcium sulfate dihydrate, a neutral zinc salt of an aliphatically saturated dicarboxylic acid selected from the group consisting of succinic, glutaric and phthalic acids, said zinc salt having a solubility in water of about 0.05 to 1.0 percent at 25 degrees C., the combined weight of the said calcium and zinc salts being between two-thirds and two and one-half times the weight of alginate, with the zinc salt being between 3 and 60 percent of such combined weight, and an inert filler powder to make 100 parts.

11. A composition as in claim 7, in which the zinc salt is zinc glutarate.

12. A composition for impression molding consisting by weight of 15 parts of water-soluble alginate, 12.5 parts of calcium sulfate dihydrate, 2.5 parts of zinc succinate, 1 part of sodium pyrophosphate, and an inert filler powder to make 100 parts.

13. A composition for impression molding consisting by weight of 15 parts of water-soluble alginate, 12.5 parts of calcium sulfate dihydrate, 2.5 parts of zinc glutarate, 1 part of sodium pyrophosphate, and an inert filler powder to make 100 parts.

References Cited in the file of this patent

UNITED STATES PATENTS

| | | |
|---|---|---|
| 2,249,694 | Wilding | July 15, 1941 |
| 2,390,137 | Vallandigham | Dec. 4, 1945 |
| 2,424,895 | Noyes | July 29, 1947 |